United States Patent
Ge et al.

(10) Patent No.: US 9,928,074 B2
(45) Date of Patent: Mar. 27, 2018

(54) SYSTEM AND METHOD FOR AN ASYNCHRONOUS PROCESSOR WITH TOKEN-BASED VERY LONG INSTRUCTION WORD ARCHITECTURE

(71) Applicant: Huawei Technologies Co., Ltd., Shenzhen (CN)

(72) Inventors: Yiqun Ge, Kanata (CA); Wuxian Shi, Kanata (CA); Qifan Zhang, Lachine (CA); Tao Huang, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 607 days.

(21) Appl. No.: 14/480,035

(22) Filed: Sep. 8, 2014

(65) Prior Publication Data
US 2015/0074379 A1    Mar. 12, 2015

Related U.S. Application Data

(60) Provisional application No. 61/874,821, filed on Sep. 6, 2013, provisional application No. 61/874,878, filed on Sep. 6, 2013.

(51) Int. Cl.
*G06F 9/38* (2006.01)
*G06F 13/42* (2006.01)

(52) U.S. Cl.
CPC .......... *G06F 9/3871* (2013.01); *G06F 9/3836* (2013.01); *G06F 9/3885* (2013.01); *G06F 13/4204* (2013.01); *G06F 13/4282* (2013.01)

(58) Field of Classification Search
CPC .. G06F 9/3817; G06F 9/3836; G06F 13/4282; G06F 13/4204; G06F 9/3871

(Continued)

(56) References Cited

U.S. PATENT DOCUMENTS 5,450,556 A * 9/1995 Slavenburg ......... G06F 9/30061
712/200
7,376,812 B1 * 5/2008 Sanghavi ............ G06F 9/30021
712/22

(Continued)

FOREIGN PATENT DOCUMENTS

EP    0212499 B1    12/1993
EP    0429733 B1    4/1999

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

(Continued)

*Primary Examiner* — Yuqing Xiao
(74) *Attorney, Agent, or Firm* — Slater Matsil, LLP (57) ABSTRACT

Embodiments are provided for an asynchronous processor with token-based very long instruction word architecture. The asynchronous processor comprises a memory configured to cache a plurality of instructions, a feedback engine configured to receive the instructions in bundles of instructions at a time (referred to as very long instruction word) and to decode the instructions, and a crossbar bus configured to transfer calculation information and results of the asynchronous processor. The apparatus further comprises a plurality of sets of execution units (XUs) between the feedback engine and the crossbar bus. Each set of the sets of XUs comprises a plurality of XUs arranged in series and configured to process a bundle of instructions received at the each set from the feedback engine.

21 Claims, 8 Drawing Sheets

(58) Field of Classification Search
USPC .......................................................... 712/24
See application file for complete search history.

(56) References Cited

U.S. PATENT DOCUMENTS

| | | | |
|---|---|---|---|
| 8,402,164 | B1 | 3/2013 | Parlour et al. |
| 8,464,025 | B2* | 6/2013 | Yamaguchi ............. G06F 15/80 345/418 |
| 2003/0056084 | A1 | 3/2003 | Holgate et al. |
| 2003/0056088 | A1* | 3/2003 | Heishi ................. G06F 9/30072 712/214 |
| 2004/0225868 | A1 | 11/2004 | Kim et al. |
| 2005/0039167 | A1* | 2/2005 | Fernandes ............. G06F 8/4441 717/116 |
| 2005/0081020 | A1 | 4/2005 | Volp |
| 2006/0155958 | A1 | 7/2006 | Duller et al. |
| 2012/0062277 | A1 | 3/2012 | Dalrymple et al. |
| 2012/0066480 | A1* | 3/2012 | Hanaki ............... G06F 9/30145 712/206 |
| 2012/0066483 | A1 | 3/2012 | Boury et al. |
| 2013/0331954 | A1* | 12/2013 | McConnell ......... G06F 15/7842 700/2 |
| 2014/0189316 | A1* | 7/2014 | Govindu ............. G06F 9/30079 712/220 |

OTHER PUBLICATIONS

Michel Laurence, "Introduction to Octasic Asynchronous Processor Technology," May 2012, IEEE 18th International Symposium on Asynchronous Circuits and Systems, pp. 113-117.*
John L. Hennessy & David A. Patterson, "Computer Architecture A Quantitative approach," (4th Ed. 2007), pp. 89-101.*
International Search Report received in PCT/US2014/054566, dated Dec. 31, 2014, 9 pages.

* cited by examiner

SYSTEM AND METHOD FOR AN ASYNCHRONOUS PROCESSOR WITH TOKEN-BASED VERY LONG INSTRUCTION WORD ARCHITECTURE

This application claims the benefit of U.S. Provisional Application No. 61/874,821 filed on Sep. 6, 2013 by Yiqun Ge et al. and entitled "Method and Apparatus for Asynchronous Processor with Token-based VLIW Architecture," and U.S. Provisional Application No. 61/874,878 filed on Sep. 6, 2013 by Yiqun Ge et al. and entitled "Method and Apparatus for Asynchronous Processor with Co-Processor," which are hereby incorporated herein by reference as if reproduced in their entirety.

TECHNICAL FIELD

The present invention relates to asynchronous processing, and, in particular embodiments, to system and method for an asynchronous processor with token-based very long instruction word architecture.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an improved and more efficient asynchronous processor architecture which is capable of processing longer instructions without increasing latency or delay.

SUMMARY OF THE INVENTION

In accordance with an embodiment, a method performed by an asynchronous processor includes issuing a plurality of instruction bundles from a feedback engine to a plurality of corresponding bundle registers (BRs) associated with a plurality of sets of arithmetic and logic units (ALUs) in the asynchronous processor. The method further includes processing, in the ALUs in each set of the sets of ALUs, a plurality of instructions in an instruction bundle received, from the feedback engine, in a corresponding BR associated with the each set. The ALUs in the each set access resources for processing the instructions using gating and passing of a plurality of tokens.

In accordance with another embodiment, an apparatus for an asynchronous processor comprises a memory configured to cache a plurality of instructions, a feedback engine configured to receive the instructions in bundles of instructions at a time and to decode the instructions, and a crossbar bus configured to transfer calculation information and results of the asynchronous processor. The apparatus further comprises a plurality of sets of execution units (XUs) between the feedback engine and the crossbar bus. Each set of the sets of XUs comprises a plurality of XUs arranged in series and configured to process a bundle of instructions received at the each set from the feedback engine.

In accordance with yet another embodiment, an apparatus for an asynchronous processor comprises a memory configured to cache a plurality of instructions, a feedback engine configured to receive the instructions in bundles of instructions at a time and to decode the instructions, and a crossbar bus configured to transfer calculation information and results of the asynchronous processor. The apparatus further comprises a plurality of sets of XUs between the feedback engine and the crossbar bus. Each set of the sets of XUs comprises a plurality of XUs arranged in parallel and configured to process a bundle of instructions received at the each set from the feedback engine.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
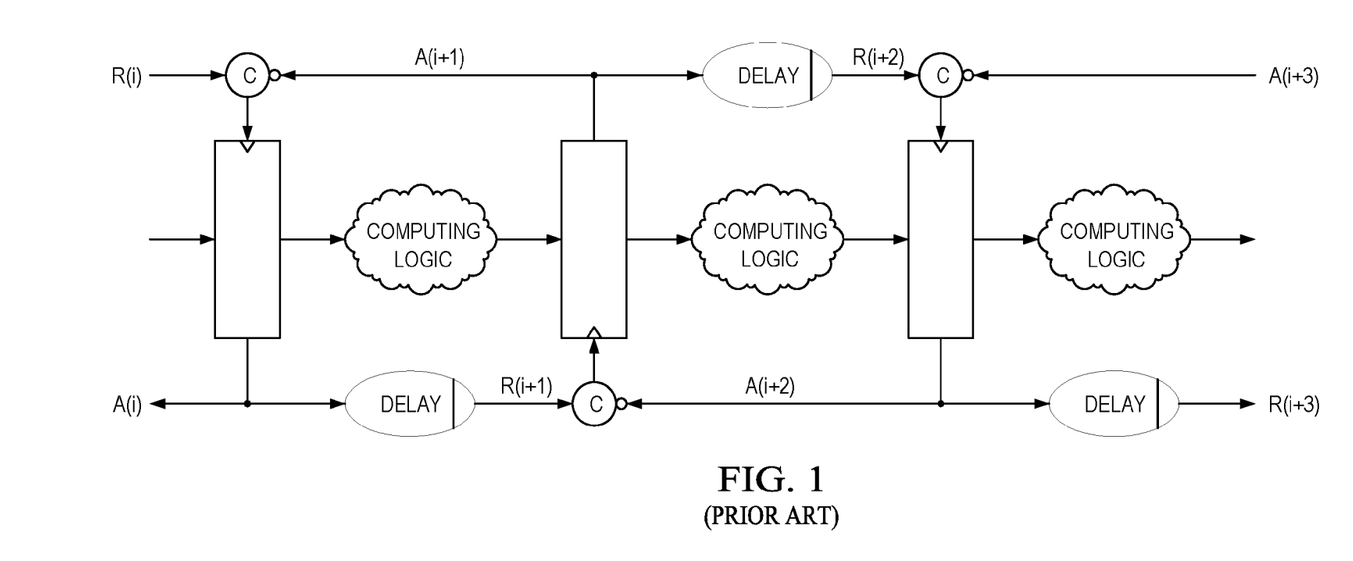
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
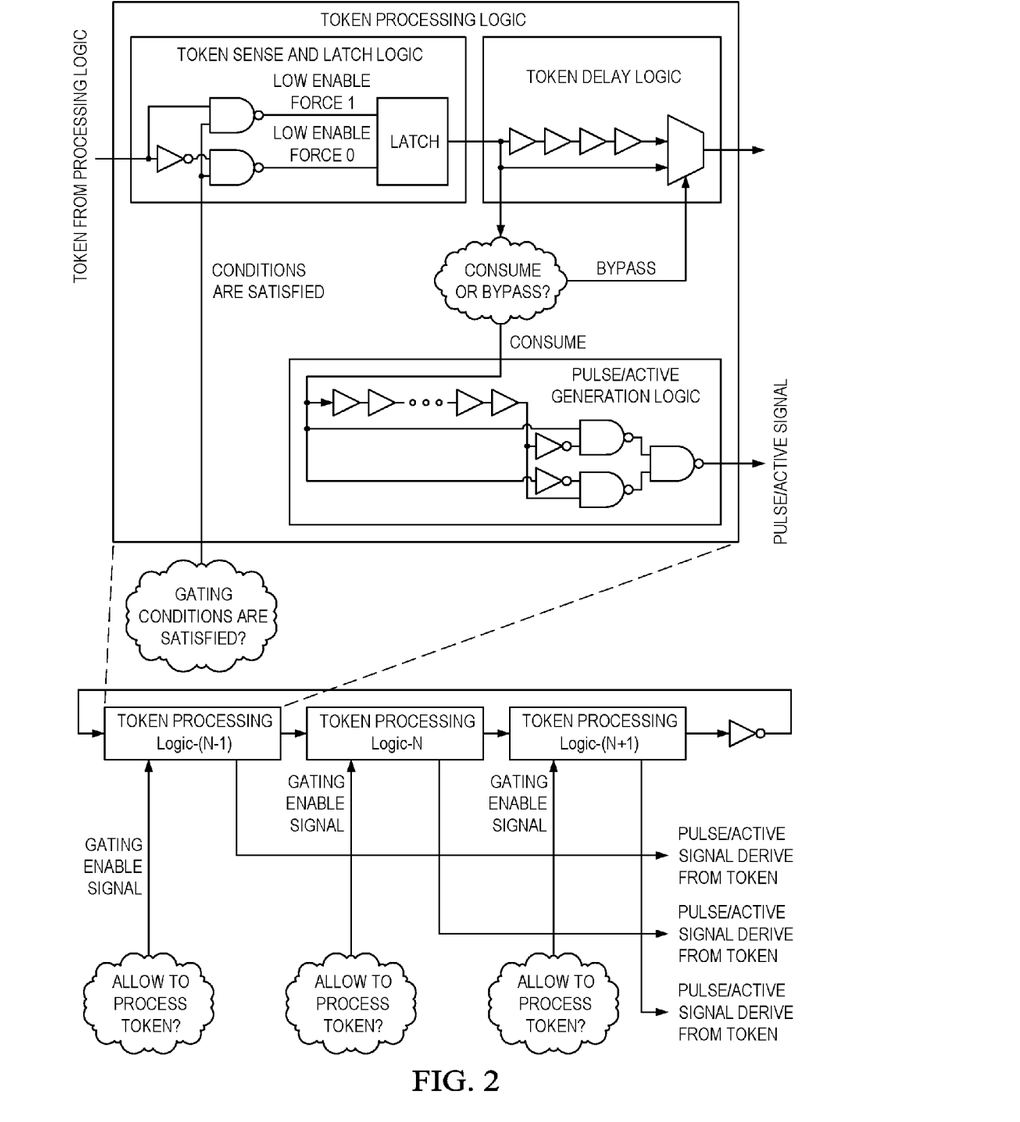
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring. Holding and passing the token signal concludes the logic's access or use of the corresponding resource, and is referred to herein as consuming the token. Once the token is consumed, it is released by this logic to a subsequent logic in the ring.

Figure 3:
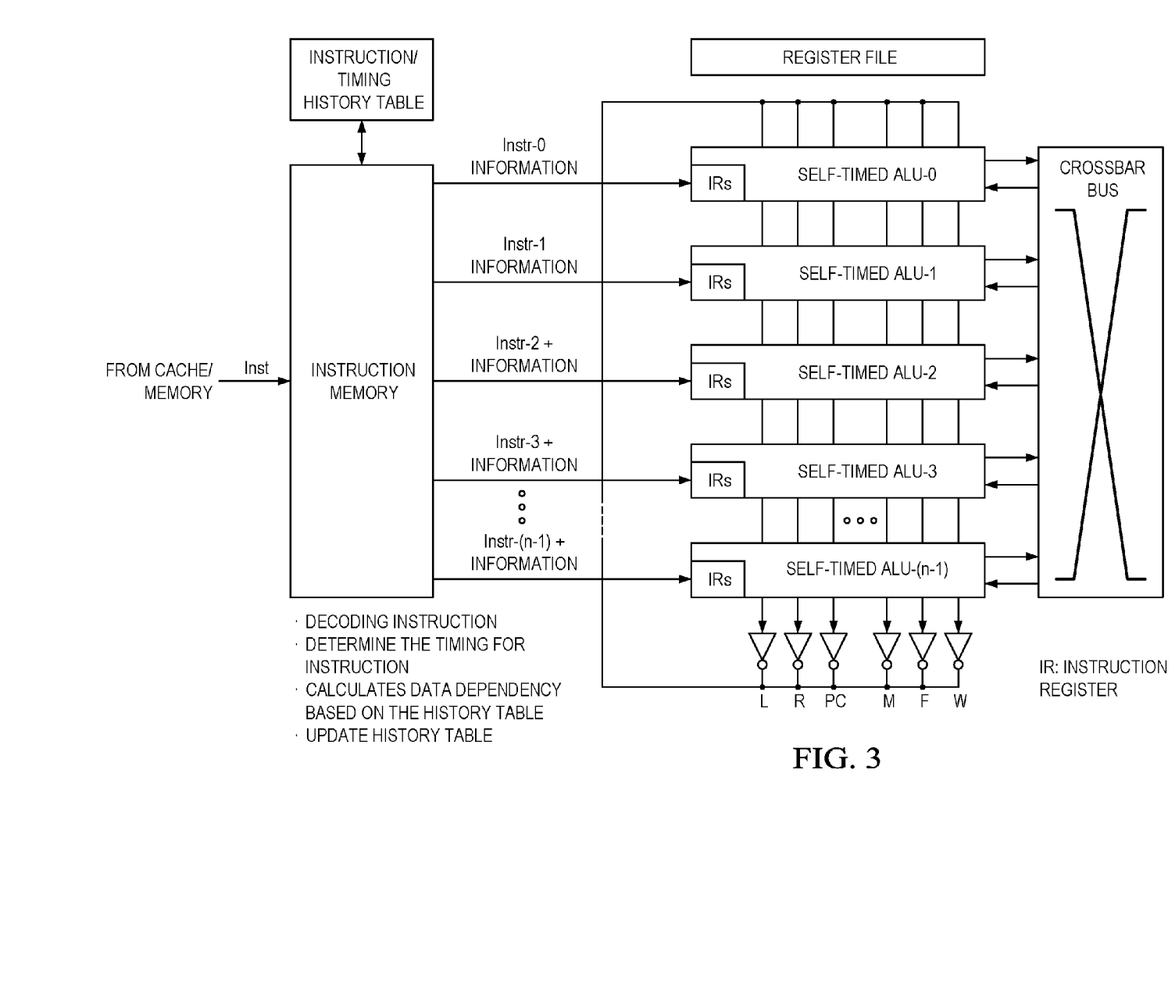
FIG. 3 illustrates an asynchronous processor architecture.

FIG. 3 illustrates an asynchronous processor architecture. The architecture includes a plurality of self-timed (asynchronous) arithmetic and logic units (ALUs) coupled in parallel in a token ring architecture as described above. The ALUs can comprise or correspond to the token processing logics of FIG. 2. The asynchronous processor architecture of FIG. 3 also includes a feedback engine for properly distributing incoming instructions between the ALUs, an instruction/timing history table accessible by the feedback engine for determining the distribution of instructions, a register file (or memory) accessible by the ALUs, and a crossbar bus for exchanging or transferring needed information between the ALUs. The table is used for indicating timing and dependency information between multiple input instructions to the processor system. The instructions from the instruction cache/memory go through the feedback engine which detects or calculates the data dependencies and determines the timing for instructions using the history table. The feedback engine pre-decodes each instruction to decide how many input operands this instruction requires. The feedback engine then looks up the history table to find whether this piece of data is on the crossbar bus or on the register file. If the data is found on the crossbar bus, the feedback engine calculates which ALU produces the data. This information is tagged to the instruction dispatched to the ALUs. The feedback engine also updates accordingly the history table. The components and functions of the architecture above can be implemented by any suitable circuit logic.

Figure 4:
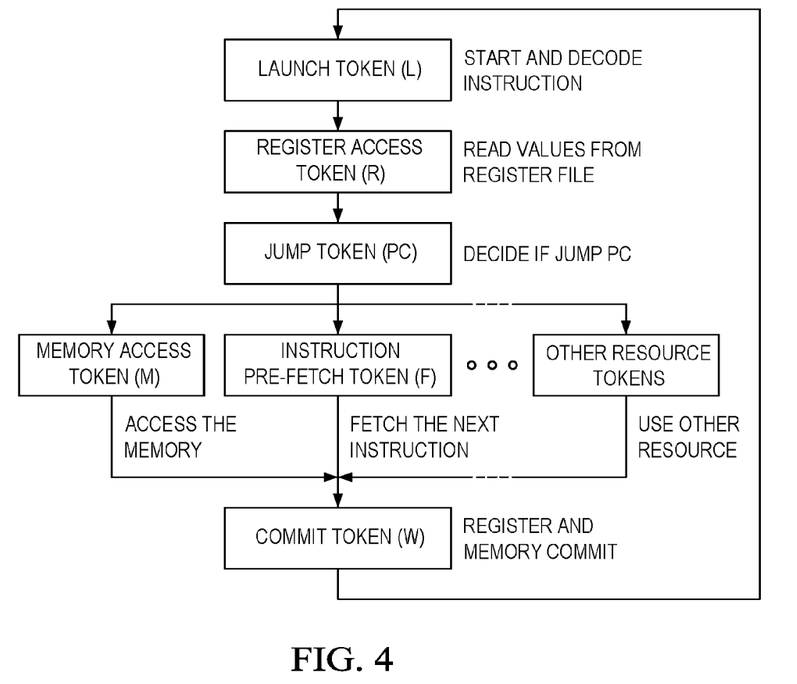
FIG. 4 illustrates token based pipelining with gating within an arithmetic and logic unit (ALU)

FIG. 4 illustrates token based pipelining with gating within an ALU, also referred to herein as token based pipelining for an intra-ALU token gating system. According to this pipelining, designated tokens are used to gate other designated tokens in a given order of the pipeline. This means when a designated token passes through an ALU, a second designated token is then allowed to be processed and passed by the same ALU in the token ring architecture. In other words, releasing one token by the ALU becomes a condition to consume (process) another token in that ALU in that given order. FIG. 4 illustrates one possible example of token-gating relationship. The tokens used include a launch token (L), a register access token (R), a jump token (PC), a memory access token (M), an instruction pre-fetch token (F), optionally other resource tokens, and a commit token (W). Consuming (processing) the L token enables the ALU to start and decode an instruction. Consuming the R token enables the ALU to read values from a register file. Consuming the PC token enables the ALU to decide whether a jump to another instruction is needed in accordance with a program counter (PC). Consuming the M token enables the ALU to access a memory that caches instructions. Consuming the F token enables the ALU to fetch the next instruction from memory. Consuming other resources tokens enables the ALU to use or access such resources. Consuming the W token enables the ALU to write or commit the processing and calculation results for instructions to the memory. Specifically, in this example, the launch token (L) gates the register access token (R), which in turn gates the jump token (PC token). The jump token gates the memory access token (M), the instruction pre-fetch token (F), and possibly other resource tokens that may be used. This means that tokens M, F, and other resource tokens can only be consumed by the ALU after passing the jump token. These tokens gate the commit token (W) to register or memory. The commit token is also referred to herein as a token for writing the instruction. The commit token in turn gates the lunch token. The gating signal from the gating token (a token in the pipeline) is used as input into a consumption condition logic of the gated token (the token in the next order of the pipeline). For example, the launch-token (L) generates an active signal to the register access or read token (R), when L is released to the next ALU. This guarantees that any ALU would not read the register file until an instruction is actually started by the launch-token.

Figure 5:
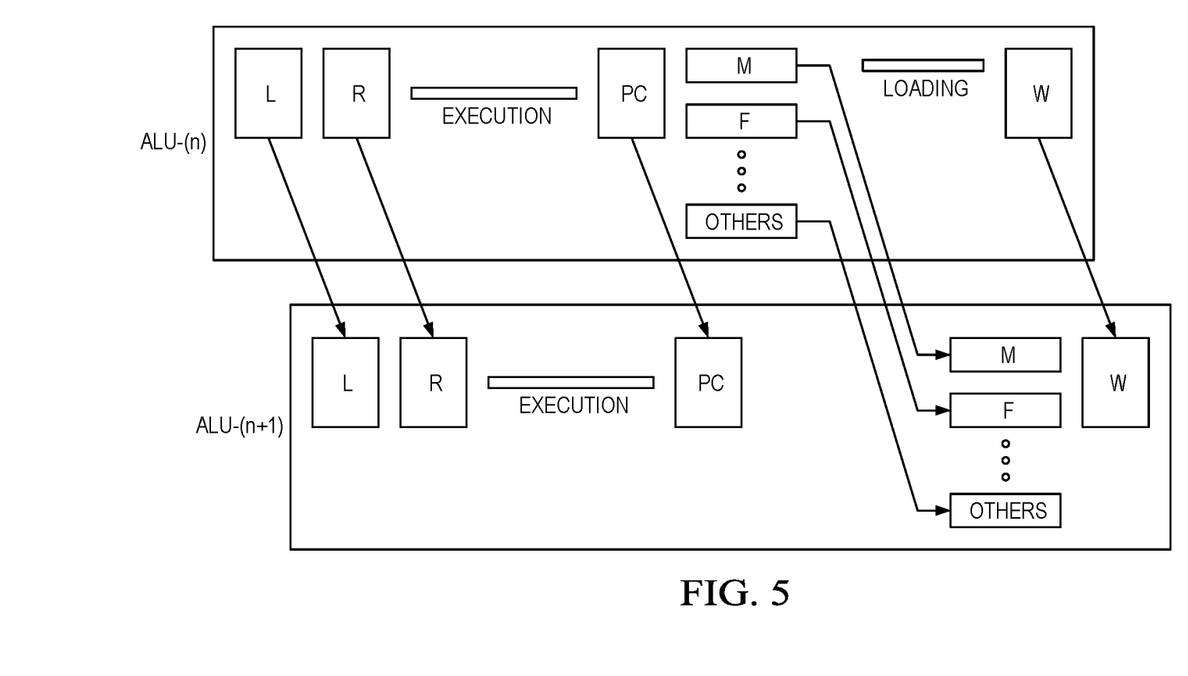
FIG. 5 illustrates token based pipelining with passing between ALUs.

FIG. 5 illustrates token based pipelining with passing between ALUs, also referred to herein as token based pipelining for an inter-ALU token passing system. According to this pipelining, a consumed token signal can trigger a pulse to a common resource. For example, the register-access token (R) triggers a pulse to the register file. The token signal is delayed before it is released to the next ALU for such a period, preventing a structural hazard on this common resource (the register file) between ALU-(n) and ALU-(n+1). The tokens preserve multiple ALUs from launching and committing (or writing) instructions in the program counter order, and also avoid structural hazard among the multiple ALUs.

The above asynchronous processor architecture and token based pipelining are suitable for handling typical size instructions. However, such system may not be suitable or efficient for handling substantially longer instructions which correspond to bundles of the typical size instructions. A bundle of typical size instructions is referred to herein as a very long instruction word (VLIW). Due to the substantially larger size of VLIWs, the architecture and token based pipelining can suffer processing or computation delays and contention of resources, which affect the overall system performance. Therefore, an improved architecture and token system (pipelining) that ensures efficient handling and processing of the VLIWs is needed.

Figure 6:
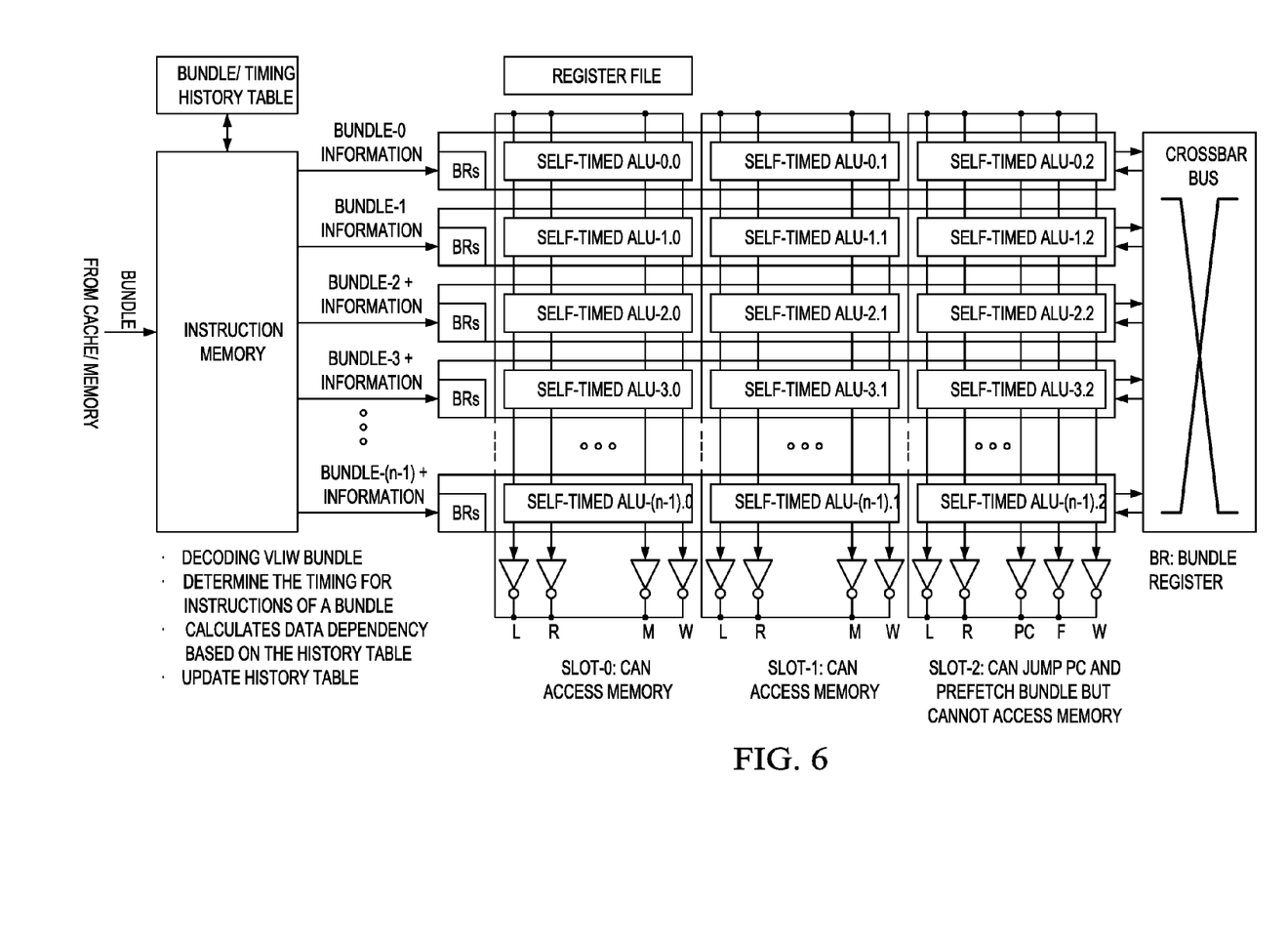
FIG. 6 illustrates an embodiment of a token-based very long instruction word (VLIW) architecture.

FIG. 6 illustrates an embodiment of a token-based VLIW architecture for an asynchronous processor that can handle VLIWs or bundles of instructions at a time, thus reducing delays and improving overall processing time. The architecture includes a plurality of token rings arranged in series (one after another) between a feedback engine and a crossbar bus. Each token ring includes a plurality of ALUs coupled in parallel in the token ring architecture. As such, the series of token rings between the feedback engine and the crossbar bus include rows of ALUs. Each row corresponds to a series of consecutive ALUs between the feedback engine and the crossbar bus. Each row of ALUs is referred to as a slot or set. The slots or sets can have the same number (n) of ALUs. For example, a first row or slot includes ALU-0.0, ALU-0.1, and ALU-0.2. The feedback engine issues (distributes), using a bundle/timing history table, incoming bundles of instructions (or VLIWs) from the cache/memory to a plurality of bundle registers (BRs) corresponding to the rows or slots of ALUs. Each BR is issued a corresponding bundle of instructions at a same time.

The BRs cache the respective received bundles of instructions. The slot or set defines a grouping of ALUs that share a BR for caching the bundle of instructions. The instructions in the bundle of instructions are processed at a same time by each ALU in the group of ALUs. A bundle of instructions (a VLIW) is fetched for each row or slot of ALUs at once using the corresponding BR. The crossbar bus allows exchanging or transferring needed information between the rows or slots of ALUs. The ALUs can also access a register file for processing the instructions. The cache/memory, feedback engine, crossbar bus, and register file are configured similar to their counterparts in the architecture of FIG. 3. However, in the token-based VLIW architecture of FIG. 6, the feedback engine issues multiple VLIWs or instruction bundles at a time, e.g., instead of individual typical size instructions, to the corresponding ALU slots. This speeds up the processing where multiple ALUs can handle the bundle of instructions at about the same time. Further, according to this token-based VLIW architecture, each token ring of ALUs across all the slots or rows of ALUs has its own token system. The slots' corresponding token systems can be used to map different resources to the slots. For instance, a first ring including ALU-0.0, ALU-0.1, ALU-2.0, ALU-3.0, and ALU-(n−1).0 can access memory using a token for this purpose, while the a third ring including ALU-0.2, ALU-1.2, ALU-2.2, ALU-3.2, and ALU-(n−1).2 can jump PC and pre-fetch a bundle using respective tokens but cannot access memory. Since the ALUs in the same slot belong to different token rings and hence different token systems, these ALUs can use dedicated resources, which avoids or reduces resource contention among the ALUs.

Figure 7:
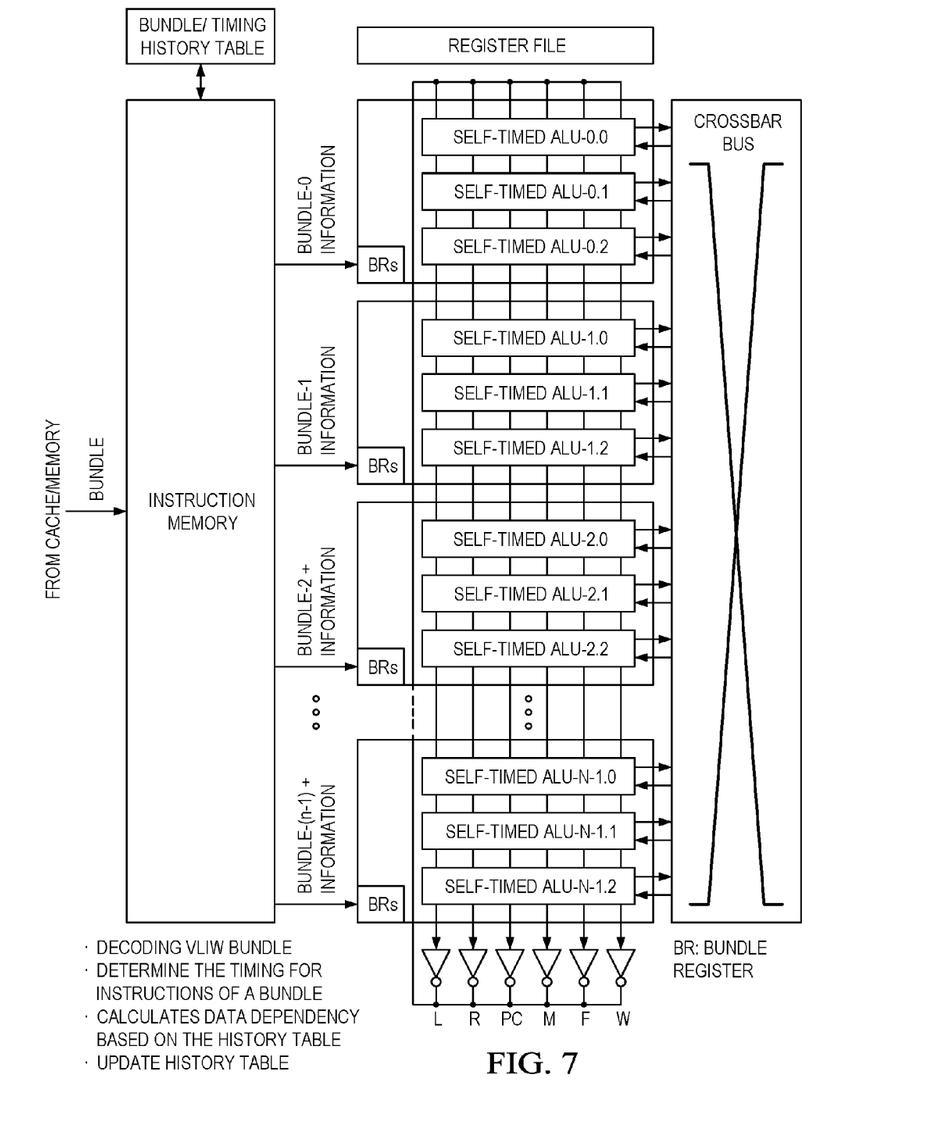
FIG. 7 illustrates another embodiment of a token-based VLIW architecture.

FIG. 7 illustrates another embodiment of a token-based VLIW architecture. The architecture includes a plurality of groupings or slots or sets of ALUs cascaded in parallel between a feedback engine and a crossbar bus. The slots of ALUs share a single token ring architecture and token gating system (share the same set of tokens and corresponding resources). As such, the same tokens pass sequentially through the ALUs from one slot to the next slot. All of the slots can consume any tokens passing through, and there is no direct mapping or exclusivity between a resource and a slot. In other words, all the slots use the same resources via the token system, unlike the case of the architecture of FIG. 6. Gating and passing the tokens in order among all the slots controls the ALUs' access to the resources. Further, each slot or set has its own BR, so that for each slot or set, a bundle of instructions is fetched or issued at once from the feedback engine to the BR of that slot. The ALUs in that slot can then process that bundle of instruction at about the same time. In FIG. 7, the cache/memory, feedback engine, crossbar bus, and register file are configured similar to their counterparts in the architecture of FIG. 6.

The system and method embodiments herein are described in the context of an ALU set in the asynchronous processor. The ALUs serve as instruction processing units that perform calculations and provide results for the corresponding issued instructions. However in other embodiments, the processor may comprise other instruction processing units instead of the ALUs. The instruction units may be referred to sometimes as execution units (XUs) or execution logics, and may have similar, different or additional functions for handling instructions than the ALUs described above. In general, the system and method embodiments described herein can apply to any instruction executions arranged in accordance with the token-based VLIW architectures above.

Figure 8:
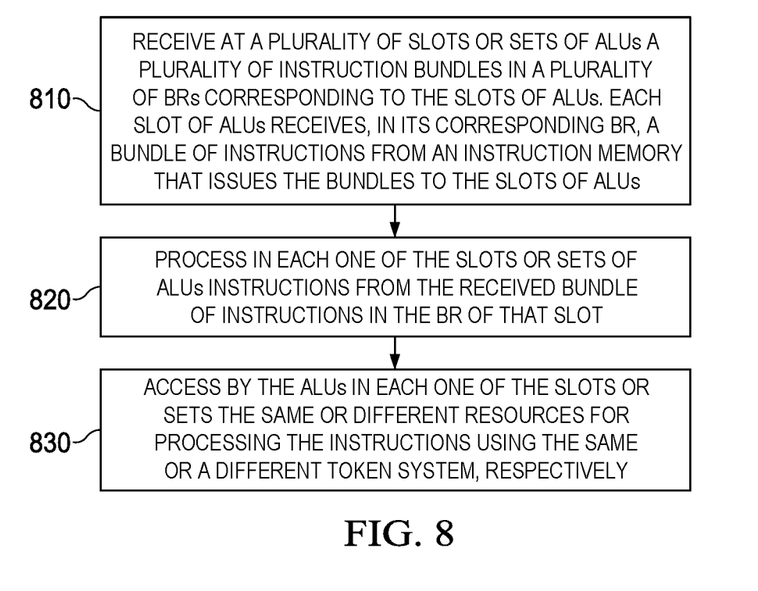
FIG. 8 illustrates an embodiment of a method for a token-based VLIW architecture.

FIG. 8 illustrates an embodiment of a method for a token-based VLIW architecture. For instance the method can be implemented using an asynchronous processor according to the token-based VLIW architecture of FIG. 6 or 7. At step 810, a plurality of slots or sets of ALUs receive a plurality of instruction bundles in a plurality of BRs corresponding to the slots of ALUs. Each slot of ALUs receives, in its corresponding BR, a bundle of instructions from a feedback engine that issues the bundles to the slots of ALUs. The ALUs in the slots can be arranged in series between the feedback engine and a crossbar bus for exchanging calculation information between the slots, as shown in FIG. 6. Alternatively, the ALUs in the slots can be arranged in parallel between the feedback engine and the crossbar bus for exchanging the information between the ALUs, as shown in FIG. 7. At step 820, the ALUs in each slot or set process instructions from the received bundle of instructions in the BR of that slot. At step 830, the ALUs in each slot or set access the same or different resources for processing the instructions using the same or a different token system, respectively. The ALUs in a slot can use the same resources and token system (same set of tokens for accessing the same set of resources), as in the case of FIG. 7. Alternatively, the ALUs in a slot can use at least one different resource and token, as in the case of FIG. 6.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an asynchronous processor comprising a matrix of arithmetic and logic units (ALUs) and a plurality of bundle registers (BRs), each ALU in a respective row of the matrix of ALUs sharing a corresponding BR, the method comprising:
   receiving, by each corresponding BR, a corresponding bundle of instructions at a first same time, each corresponding BR in the plurality of BRs receiving a different corresponding bundle of instructions at the first same time; and
   receiving, by each ALU in a respective row of the matrix of ALUs from the corresponding BR, a corresponding instruction in a plurality of instructions in the corresponding bundle of instructions, each ALU in a respective column of the matrix of ALUs accessing resources using gating and passing of a plurality of tokens to process the corresponding instruction in the plurality of instructions, the plurality of tokens being shared with other ALUs in the respective column of the matrix of ALUs, at least one column of the matrix of ALUs accesses different resources than another column of the matrix of ALUs, and each column of ALUs using a different set of token passing rings.

2. The method of claim 1, further comprising transmitting, by a memory of the asynchronous processor, the corresponding bundles of instructions to the plurality of BRs.

3. The method of claim 2, wherein each of the corresponding bundles of instructions are distributed to a corresponding one of the plurality of BRs in accordance with a bundle and timing history table.

4. The method of claim 3, wherein the matrix of ALUs is arranged between the memory and a crossbar bus for exchanging processing information between each ALU in the matrix of ALUs.

5. The method of claim 1, further comprising caching, by each corresponding BR, the corresponding bundle of instructions.

6. The method of claim 5, wherein the plurality of instructions in the corresponding bundle of instructions are further processed, by each ALU in the respective row of the matrix of ALUs, at a second same time.

7. An apparatus for an asynchronous processor comprising:
   a plurality of bundle registers (BRs), wherein each BR is configured to receive a corresponding bundle of instructions at a first same time, and wherein each corresponding BR in the plurality of BRs receives a different corresponding bundle of instructions at the first same time; and
   a matrix of arithmetic and logic units (ALUs), wherein each ALU in a respective row of the matrix of ALUs share a corresponding BR and is configured to process a corresponding instruction in a plurality of instructions in the corresponding bundle of instructions, wherein each ALU in a respective column of the matrix of ALUs, for the processing, accesses resources using gating and passing of a plurality of tokens with other ALUs in the respective column of the matrix of ALUs, and wherein at least one column of the matrix of ALUs accesses different resources than another column of the matrix of ALUs, and each column of ALUs uses different set of token passing rings.

8. The apparatus of claim 7, wherein each BR is further configured to cache the corresponding bundle of instructions.

9. The apparatus of claim 8, wherein the corresponding instruction in the plurality of instructions are further processed, by each ALU in the respective row of the matrix of ALUs, at a second same time.

10. The apparatus of claim 7, further comprising:
   a memory configured to cache bundles of instructions;
   a crossbar configured to transfer calculation information and results between each ALU;
   an instruction/timing history table configured to indicate timing and dependency information between multiple input instructions; and
   a register file configured to be accessible by each ALU in the matrix of ALUs.

11. The apparatus of claim 10, wherein the matrix of ALUs is arranged between the memory and a crossbar bus for exchanging processing information between each ALU in the matrix of ALUs.

12. A method performed by an asynchronous processor comprising a plurality of arithmetic and logic units (ALUs) and a plurality of bundle registers (BRs), the plurality of ALUs divided into subsets of ALUs, each ALU in a respective subset of ALUs sharing a corresponding BR, the method comprising:

receiving, by each corresponding BR, a corresponding bundle of instructions at a first same time, each corresponding BR in the plurality of BRs receiving a different corresponding bundle of instructions at the first same time; and receiving, by each ALU in the respective subset of ALUs, from the corresponding BR a corresponding instruction a plurality of instructions in the corresponding bundle of instructions, each ALU accessing resources using gating and passing of a plurality of tokens to process the corresponding instruction in the plurality of instructions at a second same time, the plurality of tokens being shared with other ALUs in the respective subset of ALUs, wherein all subsets of ALUs use the same set of token passing rings.

13. The method of claim 12, further comprising transmitting, by a memory of the asynchronous processor, the corresponding bundles of instructions to the plurality of BRs in accordance with a bundle and timing history table.

14. The method of claim 12, wherein the plurality of ALUs are arranged between a memory and a crossbar bus for exchanging calculation information and results between each ALU.

15. The method of claim 12, further comprising caching, by each corresponding BR, the corresponding bundle of instructions.

16. The method of claim 12, further comprising issuing, by each corresponding BR, a plurality of instructions in the corresponding bundle of instructions to a respective subset of ALUs that share the corresponding BR.

17. An apparatus for an asynchronous processor comprising:

a plurality of bundle registers (BRs), wherein each corresponding BR is configured to receive a corresponding bundle of instructions at a first same time, and wherein each corresponding BR in the plurality of BRs receives a different corresponding bundle of instructions at the first same time; and a plurality of arithmetic and logic units (ALUs) divided into subsets of ALUs, wherein each ALU in a respective subset shares a corresponding BR and is configured to process a corresponding instruction in a plurality of instructions in the corresponding bundle of instructions at a second same time, and wherein each ALU is configured to access, using gating and passing of a plurality of tokens with other ALUs, resources for the processing, wherein all subsets of ALUs use the same set of token passing rings.

18. The apparatus of claim 17, wherein each corresponding BR is further configured to cache the corresponding bundle of instructions.

19. The apparatus of claim 17, wherein each corresponding BR is configured to issue a plurality of instructions in the corresponding bundle of instructions to a respective subset of ALUs that share the corresponding BR.

20. The apparatus of claim 17, further comprising:
a memory configured to cache bundles of instructions;
a crossbar configured to exchange processing information between each ALU;
an instruction/timing history table configured to indicate timing and dependency information between multiple input instructions; and
a register file configured to be accessible by each ALU in the plurality of ALUs.

21. The apparatus of claim 20, wherein the plurality of ALUs are arranged between the memory and a crossbar bus for exchanging calculation information and results between each ALU.

* * * * *